(12) United States Patent
Gase

(10) Patent No.: US 6,363,081 B1
(45) Date of Patent: Mar. 26, 2002

(54) SYSTEM AND METHOD FOR SHARING A NETWORK PORT AMONG MULTIPLE APPLICATIONS

(75) Inventor: Stephen T. Gase, Boise, ID (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/034,645

(22) Filed: Mar. 4, 1998

(51) Int. Cl.[7] .................................................. H04J 3/16
(52) U.S. Cl. ........................ 370/466; 370/464; 710/11; 710/18
(58) Field of Search ................................ 370/464, 465, 370/466, 401, 402, 450, 451, 461, 463; 710/10, 11, 17, 19, 40, 64, 36, 240, 244; 379/93.01

(56) References Cited

U.S. PATENT DOCUMENTS

| | | | | | |
|---|---|---|---|---|---|
| 5,754,752 A | * | 5/1998 | Sheh | ............................. | 714/4 |
| 5,790,895 A | * | 8/1998 | Krontz | ........................ | 710/64 |
| 5,938,745 A | * | 8/1999 | Boyle | ........................... | 710/36 |
| 6,012,113 A | * | 1/2000 | Tuckner | ...................... | 710/64 |
| 6,073,183 A | * | 1/2000 | Stonim | ........................... | 710/3 |

* cited by examiner

Primary Examiner—Douglas Olms
Assistant Examiner—Ricardo M. Pizarro

(57) ABSTRACT

In a computer network system, data packets are transmitted to a designated network port. A port sharing protocol enables multiple applications to listen to the same port. Each interested application attempts to bind to the port. The first application to successfully bind to the port is deemed the "primary" application, and all remaining applications are deemed "secondary" applications. The secondary applications register themselves with the primary application by submitting their IP addresses and a port number of the port. The primary application adds the secondary applications to a distribution list. The primary application listens for incoming packets delivered over the port. When a packet is received, the primary application sends a copy of the packet to each secondary application on the distribution list. The primary and secondary applications are then free to consume the packets for their own purposes. As a result, multiple applications are able to receive the same data packets received over one port.

42 Claims, 5 Drawing Sheets

SYSTEM AND METHOD FOR SHARING A NETWORK PORT AMONG MULTIPLE APPLICATIONS

TECHNICAL FIELD

This invention relates to computer applications and methods for sharing network packets delivered to a specified port among multiple applications.

BACKGROUND

Networked computers communicate with each other by exchanging data packets. Each computer has a set of predefined network ports, which act as mailboxes for incoming and outgoing messages. The ports are typically configured to support a particular network protocol, and hence to receive or send a type of packet that is compatible with the protocol. For example, one common port is the UDP (User Datagram Protocol) port, which provides a channel into the computer for Datagram packets that are communicated using TCP/IP (Transport Control Protocol/Internet Protocol). Datagram packets are sent to a specific UDP port by using a programming interface, such as "sockets" (a programming interface originated in Unix operating systems that allows network communication using a file I/O metaphor).

As network traffic continues its rapid growth and more developers introduce network-sensitive products and solutions, there is an increasing number of applications that want to use the predefined network ports. It is increasingly likely that more than one application will be interested in listening for packets delivered over a single port. For example, multiple applications might be interested in listening for SNMP (Simple Network Management Protocol) packets that are sent to a single trap destination port, or BOOTP (Bootstrap Protocol) packets that are broadcast over the network but received at a single port, or SLP (Service Location Protocol) multicast packets that are sent to a specific port.

Unfortunately, these ports are a limited resource within the computer. Many of the ports, such as the UDP ports, have the characteristic that if multiple applications wish to listen for incoming packets over the same port, only one of the applications will be able to receive the packets. While it is possible to "reuse" a port that is already being used by a different process, only a single copy of the incoming packet is delivered.

Accordingly, there is a need for a technique that enables multiple applications to share heavily used ports.

SUMMARY

This invention concerns a system and method for sharing network ports among multiple applications. A port sharing protocol is implemented into the applications to facilitate delivery of data packets received over a single network port to all of the applications that contest ownership of that single port.

According to the protocol, each application attempts to bind to the contested port. The first application to successfully bind to the contested port is considered the "primary" application, and all remaining applications are deemed "secondary" applications. The primary application listens for incoming packets delivered over the contested port.

Meanwhile, all secondary applications register themselves with the primary application through a separate registration port. They submit their registration requests, which include their IP addresses and a port number of the contested port, over the registration port. The primary application receives the requests and adds the secondary applications to a distribution list. When a data packet is received over the contested port, the primary application sends a copy of the packet to each secondary application on the distribution list via the registration port. The primary and secondary applications are then free to consume the packets for their own purposes. As a result, multiple applications are able to receive the same data packets received over one port.

An aspect of the port sharing protocol is that the primary application and secondary applications can be on the same or different computers. As an example, a primary application executing on one computer can forward messages received over the contested port to secondary applications running on remote computers connected via a sub-network.

Another aspect is that the secondary applications may run on computers that do not support the same network protocol used to initially deliver the packets to the contested port. For example, UDP packets might be delivered to the contested port using TCP/IP. The primary application, which supports both TCP/IP and IPX, may then distribute the packets to secondary applications using IPX.

The port sharing protocol also supports a configuration in which one secondary application is established to monitor multiple ports. In this arrangement, multiple primary applications bind to corresponding contested ports. The monitoring application then registers itself with all primary applications so that it collects the packets received over all of the contested ports.

DETAILED DESCRIPTION

Figure 1:
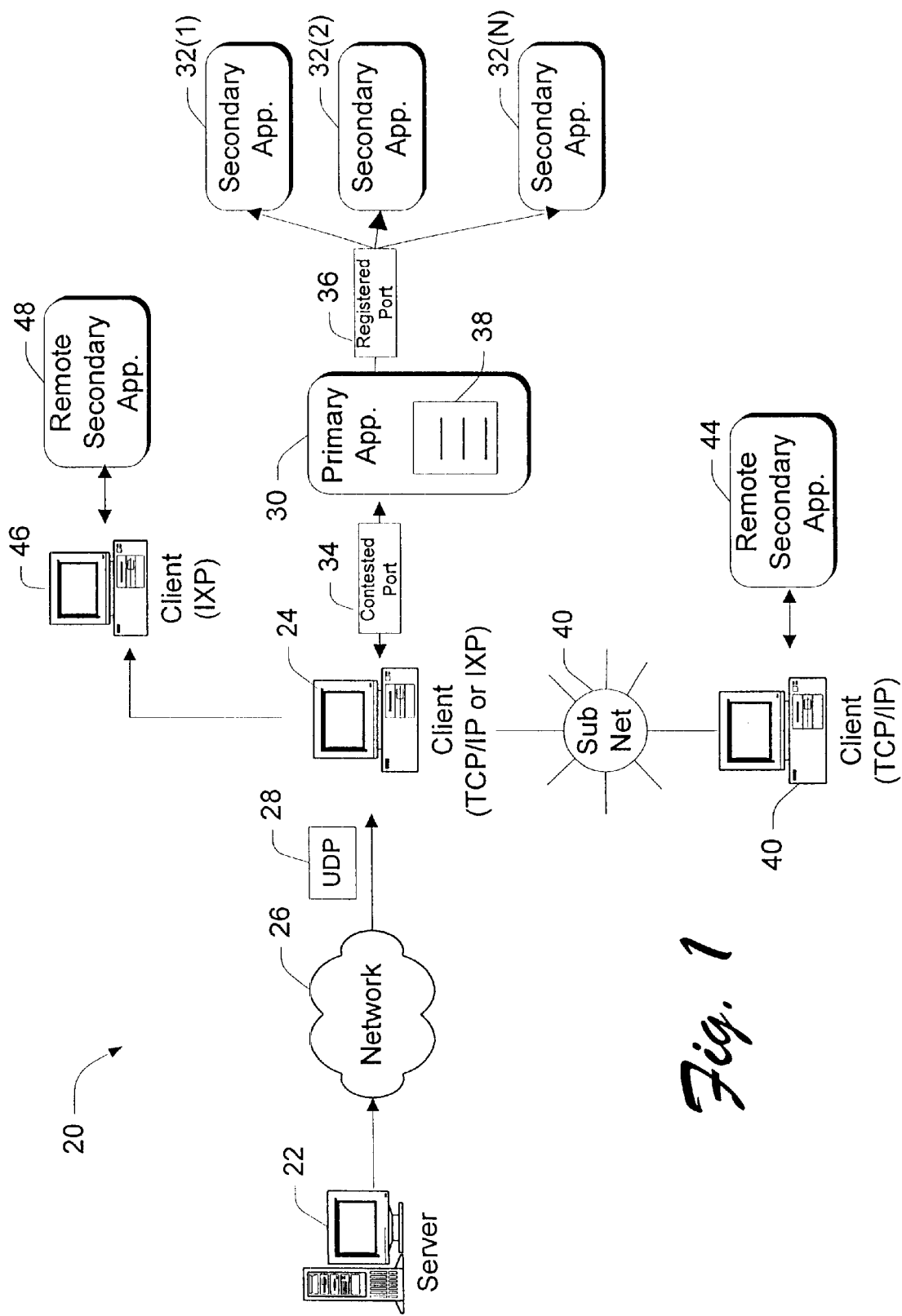
FIG. 1 shows a computer network system having a server that serves data packets to one or more clients. One client implements a primary application that listens to a network port and delivers packets received over the port to other secondary applications resident on the client or other remote clients.

FIG. 1 shows a simplified illustration of a computer network system 20 having a server 22 that provides data and services to a client 24 over a network 26. The network system 20 is representative of many different environments, including a LAN (local area network) system, a WAN (wide area network) system, and an Internet system.

The server 22 communicates with the client 24 by exchanging data packets 28 over the network 26. The data packets are configured in particular formats depending upon the underlying network protocol. In this example, the server 22 and the client 24 are exchanging UDP packets 28 using the TCP/IP network protocol.

The client computer 24 is a general-purpose computer having a processor, memory, an operating system, and network capabilities. It can be implemented in many different forms, including a personal computer, workstation, laptop computer, hand held computer, and so forth. The client 24 has several predefined network ports that are designated to receive certain types of messages from the server. As an example, it is common to specify network ports to receive SNMP packets, BOOTP packets, and SLP multicast packets.

The client 24 supports multiple applications that might be interested in listening to the same network port. Each application is configured to support a port sharing protocol that enables multiple applications to receive the packets being sent over the single "contested" port. In the FIG. 1 implementation, there is one primary application 30 and multiple secondary applications 32(1), 32(2), . . . , 32(N). Each application with port-sharing capabilities has the potential to be a primary or secondary application. The primary application 30 is the first application to successfully bind to the contested port 34. Once a primary application is established for the contested port 34, all other applications that are interested in the contested port become secondary applications.

After binding to the contested port 34, the primary application 30 designates a second network port 36 that is associated with the contested port. This second network port 36 is referred to as the "registration" port. Table 1 shows a list of services and the associated pairings of contested and registration ports.

TABLE 1

| Service | Contested Port | Registration Port |
| --- | --- | --- |
| BOOT Server | 67 | 13067 |
| SNMP Agent | 161 | 13161 |
| SNMP Trap | 162 | 13162 |
| SLP | 427 | 13427 |

All secondary applications 32(1)–32(N) register themselves and their interest in the contested port 34 with the primary application 30. Each secondary application submits a registration request to the registration port 36 that is associated with the contested port 34. That is, if a secondary application is interested in SLP packets sent to the contested port 427, the secondary application submits a registration request to the primary application over the associated registration port 13427. The registration request contains forwarding information (e.g., IP address) that is used by the primary application to forward packets received over the contested port to the secondary application. The registration request also contains a port number of the specific contested port 34. The forwarding information and contested port number are kept and correlated in a distribution list 38 that is maintained by the primary application 30.

The primary application 30 listens to all incoming data packets on the contested port 34. When a data packet is received, the primary application 30 delivers a copy of the data packet over the registration port 36 to all secondary applications registered in the distribution list 38. The primary and secondary applications are then free to consume the data packets for their own processes. In this manner, a data packet destined for a single contested port can be conveniently shared among multiple applications executing on the client computer 24.

The primary and secondary applications do not need to be located on the same computer. The port sharing protocol enables secondary applications on remote computers to register with the primary application 30. In FIG. 1, a second client 40 is connected to the first client 24 via a sub-network 42. An example of this scenario is where the first client 24 listens to messages transmitted over the Internet (i.e., network 26) and communicates those Internet messages over a LAN (i.e., sub-network 42) to the second client 40.

A remote secondary application 44 running at the second client 40 registers itself with the primary application 30 running at the first client 24. The remote secondary application 44 stipulates its interest in the contested port 34, and the primary application 30 records the contested port 34 and application's IP address in the distribution list 38. When the data packets 28 are received at the contested port 34 on the first client 24, the primary application 30 retransmits the packets via the registered port 36 and over the sub-network 42 to the remote secondary application 44. As a result, the remote secondary application 44 is able to process its own copy of the packets received at the contested port.

Another variation is that the primary application 30 can be configured to retransmit packets to remote secondary applications using a different network protocol. This situation is illustrated in FIG. 1 by a third client 46, which supports a different network protocol (e.g., IPX (Internet Packet Exchange)) than the TCP/IP protocol used to deliver the data packets 28 to the contested port 34 at the first client 24. A remote secondary application 48 running at the third client 46 is interested in receiving the data packets 28 being delivered to the contested port 34 and registers its identity and address with the primary application 30.

In this case, the first client 24 is capable of supporting both the receiving protocol (e.g., TCP/IP) and the transmitting protocol (e.g., IPX). When a UDP packet 28 is received at the contested port 34, the primary application 30 retransmits the UDP packet 28 over the registered port to the third client 46 using the transmitting IPX protocol. The remote secondary application 48 receives and processes the data packet for its own purposes.

It is further noted that the port sharing protocol permits simultaneous local and remote sharing. The primary application 30 delivers the data packets to any application listed in the distribution list 38, regardless of whether the application is local or remote.

Figure 2:
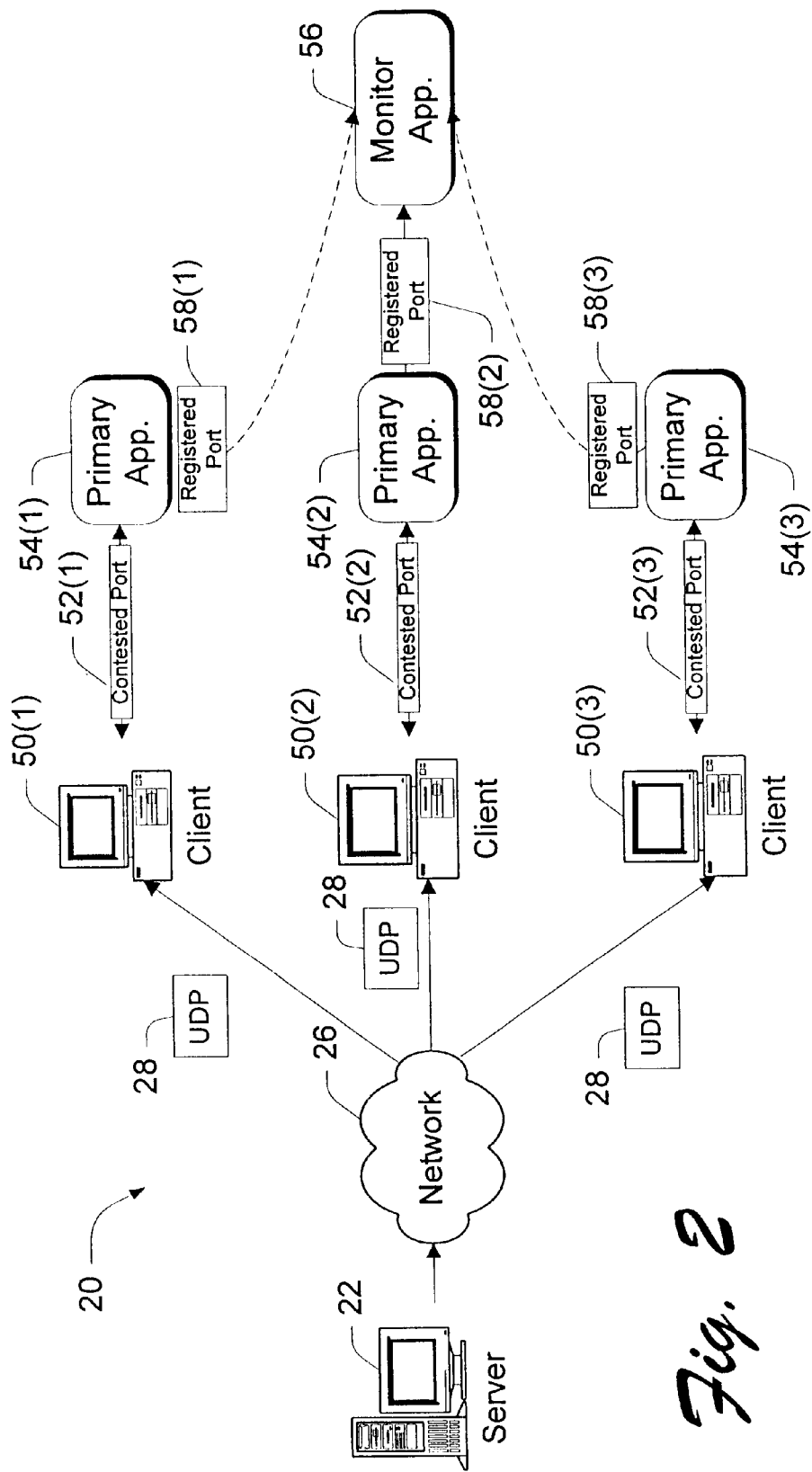
FIG. 2 shows the computer network system of FIG. 1. In this configuration, however, one secondary application is set up to monitor multiple network ports on one or more clients.

FIG. 2 shows another use of the port sharing protocol, in which a central application monitors packets arriving at multiple different ports on one or more computers. In FIG. 2, the different ports are located on different computers, and a central application residing on one computer monitors the remote ports on other computers. Suppose that the server 22 broadcasts (or multicasts) UDP packets 28 over the network 26 to multiple clients 50(1), 50(2), and 50(2). The packets 28 are delivered over the contested port 52(1), 52(2), and 52(3) on the respective clients. Primary applications 54(1), 54(2), and 54(3) bind to the contested ports 52(1)–52(3) to receive the UDP packets. A monitoring application 56 monitors the packet activity at the contested ports 52(1)–52(3). The monitoring application 56 is setup as a secondary application that is physically executing on the middle client 50(2).

The monitoring application 56 registers itself with each primary application 54(1)–54(3) via the registration ports 58(1)–58(3) corresponding to the contested ports 52(1)–52(3). That is, the monitoring application 56 submits a registration request to each primary application over a corresponding registration port. The primary applications add the monitoring application 56 to their distribution lists. When the primary applications receive data packets over their contested ports, they retransmit the packets to the monitoring application 56. As a result, the monitoring application 56 is able to keep tabs on packets arriving over multiple ports.

In another arrangement, one monitoring application can be configured to monitor multiple ports on a single computer. For instance, one computer might support multiple primary applications, each bound to an associated contested port. One monitoring application can be established as a secondary application that registers itself with all primary applications. When any packet is received at any one of the contested ports, the responsible primary application forwards the packet to the monitoring application.

Another use for the port sharing protocol involves security levels. UDP ports with numbers less than 1000 are generally considered trusted ports that are reserved by the operating system for root applications. Each application attempting to bind to a trusted port must itself be trusted and be allotted root-level access. With the port sharing protocol, the root application can distribute copies of packets it receives over the trusted port to multiple non-root applications that otherwise would not have access to these packets.

Figure 3:
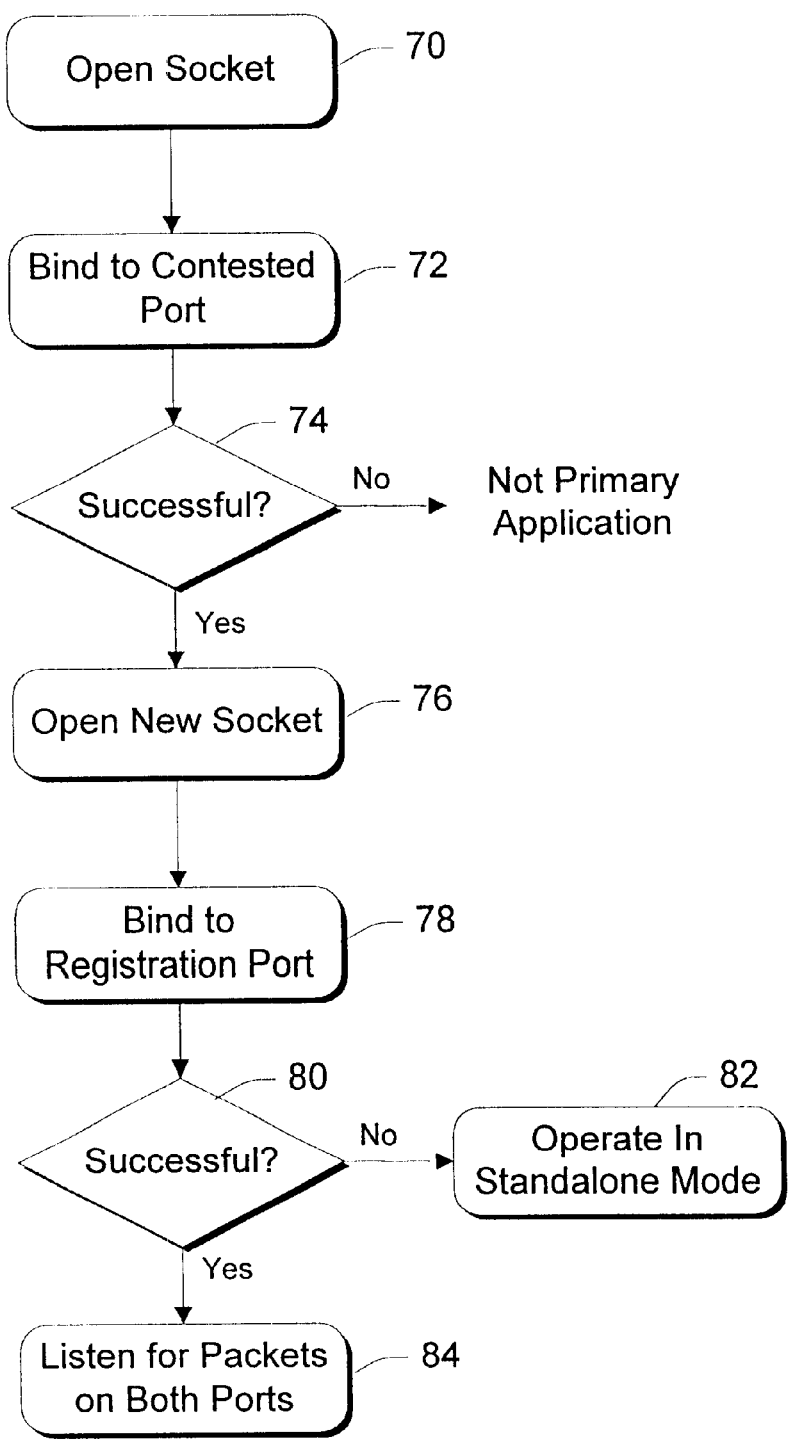
FIGS. 3–5 show steps in a port sharing protocol for sharing a network port among multiple applications.
Figure 4:
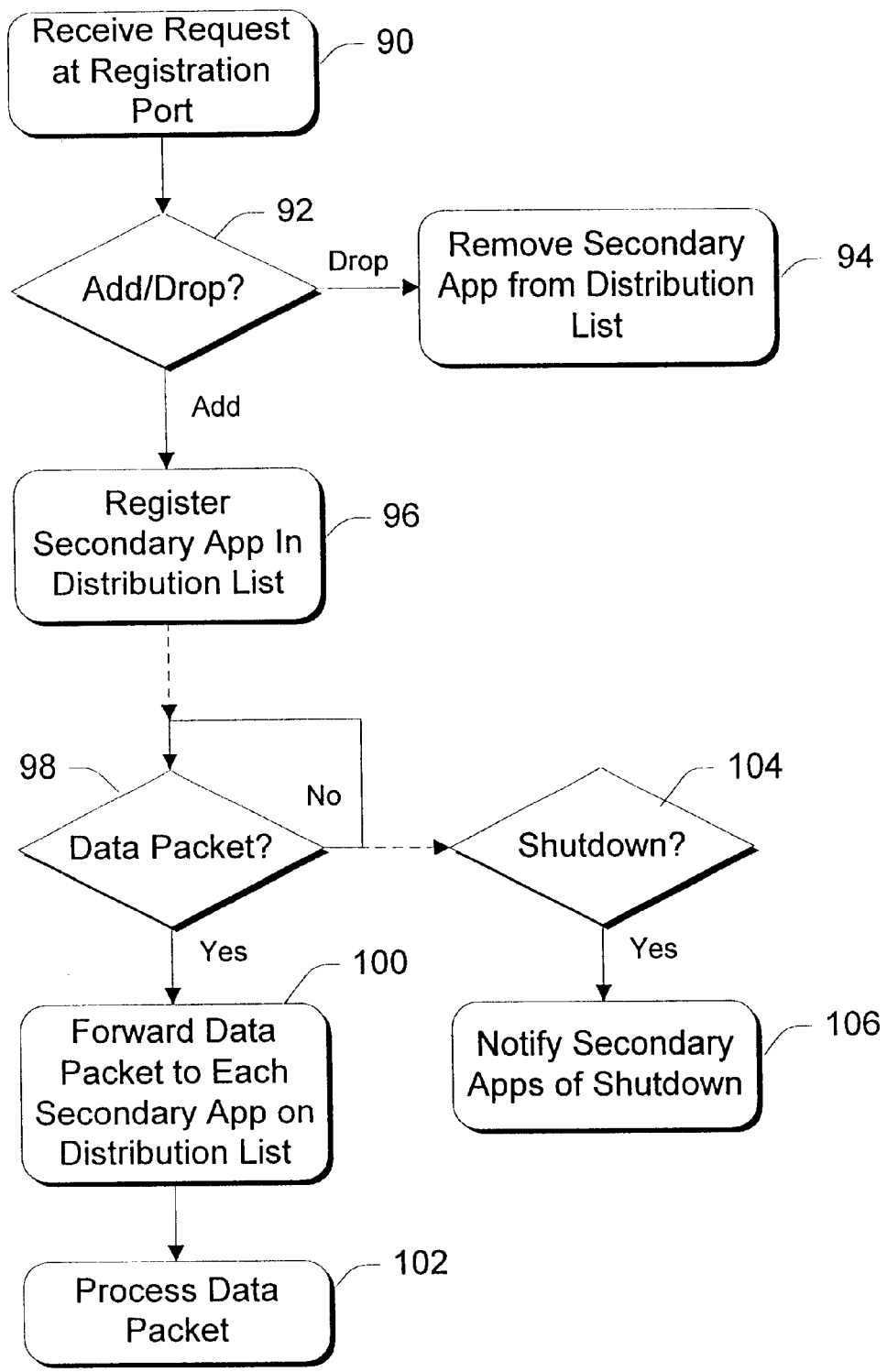
Figure 5:
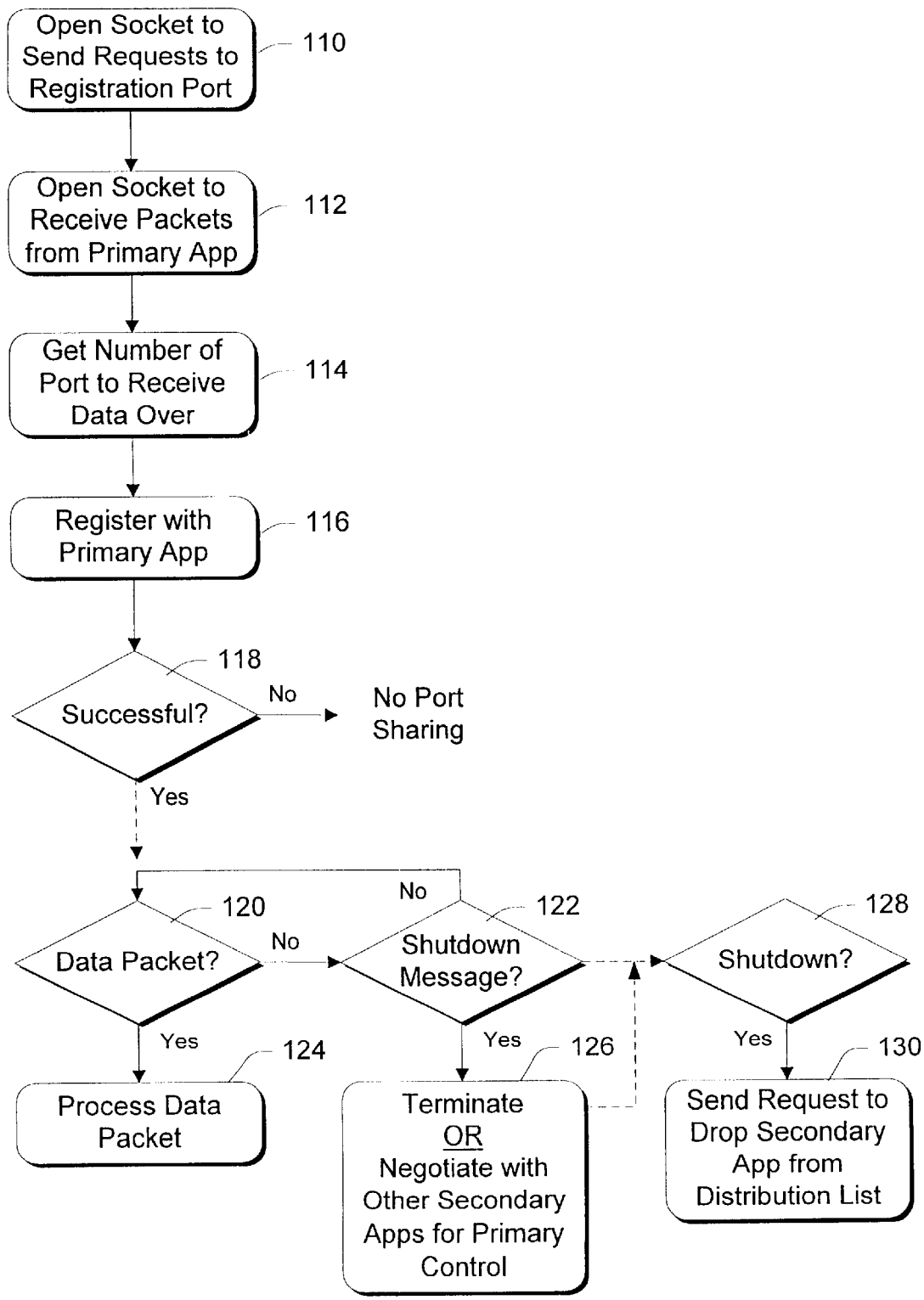

FIGS. 3–5 shows steps in a method for sharing a network port among multiple applications. Normally, when an application is started, it first attempts to become a primary application using the method described with reference to FIG. 3. If primary status is not available, the application attempts to become a secondary application. However, there are situations in which applications proceed directly to secondary status without first attempting to become primary. For example, the monitoring application in FIG. 2 is invoked initially as a secondary application.

FIG. 3 shows steps in a startup method performed by a primary application when attempting to bind to a contested port. At step 70 in FIG. 3, an application opens a socket. The application then attempts to bind to the contested port (step 72). The application may not be able to bind to the port because it lacks security or because another application is already bound to the port. If the application is unable to bind to the port (i.e., the "no" branch from step 74), it cannot be considered a primary application. Instead, the application can initiate the process to become a secondary application to the contested port (described below with reference to FIG. 5). On the other hand, if the application successfully binds to the contested port, (i.e., the "yes" branch from step 74) it is deemed to be the primary application for that contested port.

At step 76, the primary application opens a new socket to facilitate communication with a secondary application over a registration port. The primary application then attempts to bind to the registration port associated with the contested port that it controls (step 78). If the primary application is unsuccessful in its attempt to bind to the registration port (i.e., the "no" branch from step 80), the system is unable to support the port sharing protocol and the primary application reverts back to operation in the standalone mode (step 82). If the primary application successfully binds to the registration port (i.e., the "yes" branch from step 80), the primary application begins listening for incoming packets on both the registration and contested ports (step 84).

FIG. 4 shows steps in a method for handling packets received at the registration and contested ports. The primary application performs the steps illustrated in FIG. 4. At step 90, the primary application listens to the registration port to receive a registration request from a secondary application. The registration request includes either an "ADD" command seeking to register the secondary application with the primary application, or a "DROP" command seeking to de-register the secondary application. The commands specify a port number of the contested port and an IP address of the secondary application.

If the request is to drop registration (i.e., the "drop" branch from step 92 in FIG. 4), the primary application removes the IP address of the secondary application from the distribution list and returns an unregistration confirmation over the registration port to the secondary application (step 94). Conversely, if the request is for registration (i.e., the "add" branch from step 92 in FIG. 4), the primary application adds the IP address of the secondary application to the distribution list and returns a registration confirmation over the registration port to the secondary application (step 96). Table 2 shows the possible contents of a registration request.

TABLE 2

| Command | Function |
| --- | --- |
| ADD ipAddress portNum | Request from a secondary application to receive copies of data packets received over a contested port. The ipAddress may be specified as a host name, or a dotted-IP address.<br>The portNum is the number of the contested port of interest.<br>The primary application adds the ipAdress to the distribution list.<br>The primary application responds to the secondary application with a confirmation packet containing one of following messages:<br>"100 OK <PrimaryIPaddr><primaryIPport>"<br>"200 ERROR. Already Added"<br>"300 ERROR. Invalid Address"<br>"301 ERROR. Port Number Missing" |
| DROP ipAddress portNum | Request from a secondary application to remove its address from<br>The primary application responds to the secondary application with a confirmation packet containing one of following messages:<br>"100 OK"<br>"200 ERROR. Not in List"<br>"300 ERROR. Invalid Address"<br>"301 ERROR. Port Number Missing" |

Meanwhile, the primary application is continuously listening to the contested port for incoming packets (step 98). If a data packet arrives over the contested port (i.e, the "yes" branch from step 98), the primary application forwards the packet to each IP address correlated in the distribution list with the contested port (step 100). The primary application constructs a header that includes, for example, the IP address of the secondary application, a field indicating the origin of the packet, and a field indicating the size of the data contained in the packet. The data payload is appended to the header. The primary application can then process the data packet for its own consumption (step 102).

When it is time for the primary application to shut down (i.e., the "yes" branch from step 104), the primary application notifies the secondary applications of the impending shut down (step 106). The shutdown notice contains address and port information that matches the address and port included in the response to the ADD request (Table 2). The address helps the secondary application identify the appropriate primary application, in case the secondary application is registered with more than one primary application. Upon receiving a shutdown notice, the affected secondary applications begin negotiating among themselves to identify which application should become the primary application. Table 3 shows the contents of a shut down command.

TABLE 3

| Command | Function |
| --- | --- |
| SHUTDOWN<br><primaryIPaddr><br><primaryIPport> | Indicates that the primary application is unloading and will no longer perform the primary application tasks. |

TABLE 3-continued

| Command | Function |
|---|---|
|  | The address and port number is the same as that returned in the "100 OK" response to the ADD request (See Table 2). |

FIG. 5 shows steps in the port sharing method that are performed by the secondary applications. At step 110, the secondary application opens a sending socket to facilitate sending requests to the registration port. The secondary application then opens a receiving socket to facilitate receiving data from the primary application (step 112). The primary application obtains the port number of a port assigned to the receiving socket (step 114).

The secondary application registers itself with the primary application by sending an ADD request (Table 2) over the sending socket to the registration port (step 116). The secondary application includes its IP address and the contested port number within the ADD request. The secondary application then waits for a successful response (step 118). If the registration attempt is unsuccessful (i.e., the "no" branch from step 118), there is no port sharing available. The most likely reason for this is that the primary application for the contested port does not support the port sharing protocol.

On the other hand, if the registration is successful (i.e., the "yes" branch from step 118), the secondary application begins listening to the receiving socket for either a data packet or a shutdown message (steps 120 and 122). When a data packet arrives over the receiving socket (i.e., the "yes" branch from step 120), the secondary application processes the data packet (step 124). When a shutdown message arrives over the receiving socket (i.e., the "yes" branch from step 122), the secondary application has the option of terminating or negotiating with other secondary applications to become the primary application (step 126).

During negotiation, the secondary applications first execute a delay to allow the primary application to terminate. Following the delay, the secondary applications re-initialize by performing the primary attempt to become the primary application and returning to secondary status if unsuccessful in its attempt.

The secondary application may elect to shutdown or terminate by itself or in response to a shutdown notice received from the primary application (step 128). When the secondary application chooses to shutdown, it unregisters itself from the primary application by sending a DROP request (step 130). The DROP request includes the IP address of the secondary application along with the contested port number. In response, the primary application removes the secondary application from the distribution list. If the secondary application terminates as a result of receiving the shutdown notice from the primary application, it does not need to send a DROP request because the primary application automatically purges the distribution list.

The invention has been described in language specific to structural features and/or methodological steps. It is to be understood, however, that the invention defined is not necessarily limited to the specific features or steps described above. Rather, the specific features and steps are disclosed as exemplary forms of implementing the claimed invention.

What is claimed is:

1. A method for sharing a network port among multiple applications, comprising the following steps:

establishing a primary application responsible for listening to data packets received over the network port;

registering one or more secondary applications with the primary application, the secondary applications being interested in receiving the data packets delivered over the network port, the registering step additionally comprising submitting a registration request from each of the secondary applications to the primary application, the registration request containing an address of said each secondary application and an identity of the network port; and when a data packet is received over the network port, delivering a copy of the data packet from the primary application to the secondary applications that are registered with the primary application.

2. A method as recited in claim 1, wherein the establishing step comprises the steps of opening a socket and binding to the network port.

3. A method as recited in claim 1, wherein the registering step comprises the step of recording an identity of the secondary applications on a distribution list maintained by the primary application.

4. A method as recited in claim 1, further comprising the following steps:

designating a registration port in association with the network port; and using the registration port to register the secondary applications.

5. A method as recited in claim 1, further comprising the step of processing the data packets at the primary application and the secondary applications.

6. A method as recited in claim 1, wherein:

the establishing step comprises the step of establishing multiple primary applications in conjunction with multiple corresponding network ports;

the registering step comprises the step of registering one secondary application with the multiple primary applications; and monitoring, at the secondary application, the data packets received over the multiple network ports.

7. A method as recited in claim 1, wherein:

the establishing step comprises the step of establishing a root application for listening to data packets received over a root-level network port; and the registering step comprises the step of registering one or more non-root applications with the root application.

8. A method as recited in claim 1, wherein the primary application is executed on a first computer and the one or more secondary applications are executed on one or more computers separate from the first computer.

9. A method as recited in claim 1, wherein the data packet is received over the network port using a first network protocol, and the delivering step comprises the step of sending the data packet to the secondary applications using a second network protocol different from the first network protocol.

10. A method as recited in claim 1, further comprising the following steps:

terminating the primary application; and negotiating among the secondary applications to determine a new primary application.

11. A method as recited in claim 1, further comprising the following steps:

terminating a secondary application; and unregistering the secondary application from the primary application.

12. A method for sharing a network port among multiple applications, comprising the following steps:

establishing multiple primary applications in conjunction with multiple corresponding network ports responsible for listening to data packets received over the network port;

registering one or more secondary applications with the multiple primary applications, the one or more secondary applications being interested in receiving the data packets delivered over the network port;

when a data packet is received over the network port, delivering a copy of the data packet from at least one of the primary applications to the secondary applications that are registered with the primary applications; and monitoring, at the secondary applications, the data packets received over the multiple network ports.

13. A method as recited in claim 12, wherein the establishing step comprises opening a socket and binding to the network port.

14. A method as recited in claim 12, wherein the registering step comprises the step of submitting a registration request from each of the secondary applications to at least one of the primary applications, the registration request containing an address of said each secondary application and an identity of the network port.

15. A method as recited in claim 12, wherein the registering step comprises the step of recording an identity of the secondary applications on a distribution list maintained by the primary applications.

16. A method as recited in claim 12, further comprising the following steps:

designating a registration port in association with the network port; and using the registration port to register the secondary applications.

17. A method as recited in claim 12, further comprising the step of processing the data packets at the primary applications and the secondary applications.

18. A method as recited in claim 12, wherein:

the establishing step comprises the step of establishing a root application for listening to data packets received over a root-level network port; and the registering step comprises the step of registering one or more non-root applications with the root application.

19. A method as recited in claim 12, wherein the primary applications are executed on a first computer and the one or more secondary applications are executed on one or more computers separate from the first computer.

20. A method as recited in claim 12, wherein the data packet is received over the network port using a first network protocol, and the delivering step comprises the step of sending the data packet to the secondary applications using a second network protocol different from the first network protocol.

21. A method as recited in claim 12, further comprising the following steps:

terminating the primary applications; and negotiating among the secondary applications to determine new primary applications.

22. A method as recited in claim 12, further comprising the following steps:

terminating a secondary application; and unregistering the secondary application from the primary applications.

23. A method for sharing a network port among multiple applications, comprising the following steps:

establishing a primary application responsible for listening to data packets received over the network port;

registering one or more secondary applications with the primary application, the secondary applications being interested in receiving the data packets delivered over the network port;

when a data packet is received over the network port, delivering a copy of the data packet from the primary application to the secondary applications that are registered with the primary application;

terminating a secondary application; and unregistering the secondary application from the primary application.

24. A method as recited in claim 23, wherein the establishing step comprises the steps of opening a socket and binding to the network port.

25. A method as recited in claim 23, wherein the registering step comprises the step of submitting a registration request from each of the secondary applications to the primary application, the registration request containing an address of said each secondary application and an identity of the network port.

26. A method as recited in claim 23, wherein the registering step comprises the step of recording an identity of the secondary applications on a distribution list maintained by the primary application.

27. A method as recited in claim 23, further comprising the following steps:

designating a registration port in association with the network port; and using the registration port to register the secondary applications.

28. A method as recited in claim 23, further comprising the step of processing the data packets at the primary application and the secondary applications.

29. A method as recited in claim 23, wherein:

the establishing step comprises the step of establishing multiple primary applications in conjunction with multiple corresponding network ports; and the registering step comprises the step of registering one secondary application with the multiple primary applications; and monitoring, at the secondary application, the data packets received over the multiple network ports.

30. A method as recited in claim 23, wherein:

the establishing step comprises the step of establishing a root application for listening to data packets received over a root-level network port; and the registering step comprises the step of registering one or more non-root applications with the root application.

31. A method as recited in claim 23, wherein the primary application is executed on a first computer and the one or more secondary applications are executed on one or more computers separate from the first computer.

32. A method as recited in claim 23, wherein the data packet is received over the network port using a first network protocol, and the delivering step comprises the step of sending the data packet to the secondary applications using a second network protocol different from the first network protocol.

33. A method as recited in claim 23, further comprising the following steps:

terminating the primary application; and negotiating among the secondary applications to determine a new primary application.

34. A secondary application embodied in software stored on a computer-readable medium, comprising:

code means for submitting a registration request over a registration port to a primary application, the registration request from the secondary application to the primary application containing an address of said each secondary application and an identity of the network port, the primary application being responsible for listening for packets received over a contested port that is separate from, but associated with, the registration port, the registration request containing information used by the primary application to send the packets received over the contested port to the secondary application;

code means for receiving the packets over the registration port from the primary application; and code means for processing the packets; and code means for terminating the secondary application.

35. A secondary application as recited in claim 34, further comprising code means for submitting an unregistration request over the registration port to the primary application in the event the secondary application decides to terminate.

36. A port sharing architecture for a networked computer system in which multiple applications are interested in using a contested port to receive data packets, comprising:

multiple primary applications to listen for the data packets received over multiple corresponding contested ports, the primary applications also listening for messages received over a registration port associated with the contested port;

a secondary application to communicate with the primary application via the registration port, the secondary application registering with the multiple primary applications to receive copies of the data packets received over the multiple contested ports; and when a data packet is received over the contested port, the primary application delivers a copy of the data packet to the secondary application over the registration port.

37. A port sharing architecture as recited in claim 36, further comprising multiple secondary applications that register with the primary application.

38. A port sharing architecture as recited in claim 36, wherein the primary application and the secondary application are executed on different computers.

39. A port sharing architecture as recited in claim 36, wherein the data packet arrives over the contested port according to one network protocol, and the primary application delivers the copy to the secondary application using a second network protocol that is different from the first network protocol.

40. A primary application embodied in software stored on a computer-readable medium, comprising:

code means for binding to a contested port;

code means for binding to a registration port separate from, but associated with, the contested port;

code means for listening for packets received over the contested and registration ports;

code means for registering a secondary application that sends over the registration port a registration packet containing a request to receive copies of the packets received over the contested port;

code means for copying the packets received over the contested port; and code means for delivering the copy of the packets over the registration port to the registered secondary application.

41. A primary application as recited in claim 40, further comprising code means for processing the packets received over the contested port.

42. A primary application as recited in claim 40, further comprising code means for notifying the secondary application of an impending shutdown by sending a shutdown notice over the registration port to the secondary application.

* * * * *